US00RE36823E

United States Patent [19]

Takagi et al.

[11] E Patent Number: Re. 36,823

[45] **Reissued Date of Patent: *Aug. 15, 2000**

[54] INFERENCE RULE DETERMINING METHOD AND INFERENCE DEVICE

[75] Inventors: Hideyuki Takagi, Fukuoka; Isao Hayashi, Osaka, both of Japan

[73] Assignee: Matsushita Electric Industrial Co., Ltd., Osaka, Japan

[ * ] Notice: This patent is subject to a terminal disclaimer.

[21] Appl. No.: 08/542,852

[22] Filed: Oct. 13, 1995

Related U.S. Patent Documents

Reissue of:

[64] Patent No.: 5,255,344
Issued: Oct. 19, 1993
Appl. No.: 08/904,690
Filed: Jun. 26, 1992

U.S. Applications:

[63] Continuation of application No. 07/459,815, filed as application No. PCT/JP89/00504, May 19, 1989, Pat. No. 5,168,549.

[30] Foreign Application Priority Data

May 20, 1988 [JP] Japan ..... 63-124354

[51] Int. Cl.[7] ..... G05B 13/00

[52] U.S. Cl. ..... 706/2; 706/6; 706/900; 395/22; 395/900

[58] Field of Search ..... 395/3, 21, 22

[56] References Cited

U.S. PATENT DOCUMENTS

| | | | |
|---|---|---|---|
| 4,730,259 | 3/1988 | Gallant | 706/16 |
| 4,773,099 | 9/1988 | Bokser | 382/14 |
| 4,837,725 | 6/1989 | Yamakawa | 364/807 |

FOREIGN PATENT DOCUMENTS

| | | | |
|---|---|---|---|
| 61-234405 | 10/1986 | Japan | G05B 13/04 |
| 293940 | 4/1990 | Japan | G06F 9/44 |

OTHER PUBLICATIONS

"Fuzzy Modeling" Society of Instrument and Control Engineers Papers, vol. 23, No. 6, pp. 650–652, 1987; Gean–Taek Kang, Michio Sugeno.

"Revised GMDH Algorithm Estimating Degree of the Complete Polynomial", pp. 928–934, 1986.

D. E. Rumelhart, G.E. Hinton and R. J. Williams, "Learning Representations by Back–propergating Errors", Nature, vol. 323, pp. 523–536, Oct. 9, 1986.

Procyk et al., "A Linguistic Self–Organizing Controller", *Automatica*, v.15, pp. 15–30 Jan. 1979.

Hayashi et al., "Neural–Network–Driven Fuzzy Reasoning Model", Proc. 28$^{th}$ SICE Annul.Conf., Jul. 1989, 1343–1346.

(List continued on next page.)

*Primary Examiner*—Robert W. Downs
*Attorney, Agent, or Firm*—Stevens, Davis, Miller & Mosher, L.L.P.

[57] ABSTRACT

An inference rule determining process according to the present invention sequentially determines, using a learning function of a neural network model, a membership function representing a degree which the conditions of the IF part of each inference rule is satisfied when input data is received to thereby obtain an optimal inference result without using experience rules. The inventive inference device uses an inference rule of the type "IF . . . THEN . . ." and includes a membership value determiner (1) which includes all of IF part and has a neural network; individual inference quantity determiners (21)–(2r) which correspond to the respective THEN parts of the inference rules and determine the corresponding inference quantities for the inference rules; and a final inference quantity determiner which determines these inference quantities synthetically to obtain the final results of the inference. If the individual inference quantity determiners (2) each has a neural network structure, the non-linearity of the neural network models is used to obtain the result of the inference with high inference accuracy even if in object to be inferred is non-linear.

14 Claims, 11 Drawing Sheets

OTHER PUBLICATIONS

Lippmann, R. P., "An Intro. to Computing with Neural Nets," IEEE ASSP Mag. Apr. 1987, 4–22.

Takagi et al., "Artificial Neural Network Driven Fuzzy Reasoning" Intl. Workshop on Fuzzy System Applications, Aug. 1988, 217–218.

Isao Hayashi, et al, "Formulation of Fuzzy Reasoning by Neural Network", 4th Fuzzy Symposium (Tokyo, May 30–31, 1988), pp. 55–60.

C.G. Looney, "Learning in Three–Plex Fuzzy Logic Networks," Proceedings of the ISMM International Symposium, XP000566865, Feb. 1–3, 1988, pp. 157–160.

J. Voevodsky, "Plato/Aristotle: A Neural Net Knowledge Processor," IEEE First International Conference on Neural Networks, XP002058597, Jun. 21–24, 1987, San Diego, CA, pp. 399–408.

L.C. Shiue and R.O. Grondin, "On Designing Fuzzy Learning Neural–Automata," IEEE First International Conference on Neural Networks, XP002058598, Jun. 21–24, 1987, San Diego, CA, pp. II–299 through 11–307.

FIG. 10

| IDENTIFICATION DATA | | | | | | EVALUATION DATA | | | | | |
|---|---|---|---|---|---|---|---|---|---|---|---|
| No | y | $X_1$ | $X_2$ | $X_3$ | $X_4$ | No | y | $X_1$ | $X_2$ | $X_3$ | $X_4$ |
| 1 | 11.110 | 1 | 3 | 1 | 1 | 21 | 9.545 | 1 | 1 | 5 | 1 |
| 2 | 6.521 | 1 | 5 | 2 | 1 | 22 | 6.043 | 1 | 3 | 4 | 1 |
| 3 | 10.190 | 1 | 1 | 3 | 5 | 23 | 5.724 | 1 | 5 | 3 | 5 |
| 4 | 6.043 | 1 | 3 | 4 | 5 | 24 | 11.250 | 1 | 1 | 2 | 5 |
| 5 | 5.242 | 1 | 5 | 5 | 1 | 25 | 11.110 | 1 | 3 | 1 | 1 |
| 6 | 19.020 | 5 | 1 | 4 | 1 | 26 | 14.360 | 5 | 5 | 2 | 1 |
| 7 | 14.150 | 5 | 3 | 3 | 5 | 27 | 19.610 | 5 | 1 | 3 | 5 |
| 8 | 14.360 | 5 | 5 | 2 | 5 | 28 | 13.650 | 5 | 3 | 4 | 5 |
| 9 | 27.420 | 5 | 1 | 1 | 1 | 29 | 12.430 | 5 | 5 | 5 | 1 |
| 10 | 15.390 | 5 | 3 | 2 | 1 | 30 | 19.020 | 5 | 1 | 4 | 1 |
| 11 | 5.724 | 1 | 5 | 3 | 5 | 31 | 6.380 | 1 | 3 | 3 | 5 |
| 12 | 9.766 | 1 | 1 | 4 | 5 | 32 | 6.521 | 1 | 5 | 2 | 5 |
| 13 | 5.8700 | 1 | 3 | 5 | 1 | 33 | 16.000 | 1 | 1 | 1 | 1 |
| 14 | 5.406 | 1 | 5 | 4 | 1 | 34 | 7.219 | 1 | 3 | 2 | 1 |
| 15 | 10.190 | 1 | 1 | 3 | 5 | 35 | 5.724 | 1 | 5 | 3 | 5 |
| 16 | 15.390 | 5 | 3 | 2 | 5 | 36 | 19.020 | 5 | 1 | 4 | 5 |
| 17 | 19.680 | 5 | 5 | 1 | 1 | 37 | 13.390 | 5 | 3 | 5 | 1 |
| 18 | 21.060 | 5 | 1 | 2 | 1 | 38 | 12.680 | 5 | 5 | 4 | 1 |
| 19 | 14.150 | 5 | 3 | 3 | 5 | 39 | 19.610 | 5 | 1 | 3 | 5 |
| 20 | 12.680 | 5 | 5 | 4 | 5 | 40 | 15.390 | 5 | 3 | 2 | 5 |

FIG. 11

| IDENTIFICATION DATA | | | | MEMBERSHIP VALUE | |
|---|---|---|---|---|---|
| No. | $X_1$ | $X_2$ | $X_3$ | RULE 1 | RULE 2 |
| 1 | 1 | 3 | 1 | 0.9970 | 0.0031 |
| 2 | 1 | 5 | 2 | 0.9972 | 0.0028 |
| 3 | 1 | 1 | 3 | 0.9972 | 0.0028 |
| 4 | 1 | 3 | 4 | 0.9973 | 0.0027 |
| 5 | 1 | 5 | 5 | 0.9974 | 0.0026 |
| 6 | 5 | 1 | 4 | 0.0028 | 0.9971 |
| 7 | 5 | 3 | 3 | 0.0028 | 0.9972 |
| 8 | 5 | 5 | 2 | 0.0027 | 0.9972 |
| 9 | 5 | 1 | 1 | 0.0027 | 0.9973 |
| 10 | 5 | 3 | 2 | 0.0027 | 0.9973 |
| 11 | 1 | 5 | 3 | 0.9973 | 0.0028 |
| 12 | 1 | 1 | 4 | 0.9973 | 0.0027 |
| 13 | 1 | 3 | 5 | 0.9974 | 0.0026 |
| 14 | 1 | 5 | 4 | 0.9973 | 0.0027 |
| 15 | 1 | 1 | 3 | 0.9972 | 0.0028 |
| 16 | 5 | 3 | 2 | 0.0027 | 0.9973 |
| 17 | 5 | 5 | 1 | 0.0027 | 0.9973 |
| 18 | 5 | 1 | 2 | 0.0027 | 0.9973 |
| 19 | 5 | 3 | 3 | 0.0028 | 0.9972 |
| 20 | 5 | 5 | 4 | 0.0029 | 0.9971 |

FIG. 12

| | RULE 1 : $\theta_3^1$ | RULE 2 : $\theta_3^2$ |
|---|---|---|
| WHEN $X_1$ IS REMOVED | 42.84 | 0.93 |
| WHEN $X_2$ IS REMOVED | 74.71 | 119.61 |
| WHEN $X_3$ IS REMOVED | 55.27 | 73.28 |

FIG. 13

| IDENTIFICATION DATA | | | | | EVALUATION DATA | | | | |
|---|---|---|---|---|---|---|---|---|---|
| No. | y | y* | $W_i^1$ | $W_i^2$ | No. | y | y* | $W_i^1$ | $W_i^2$ |
| 1 | 11.110 | 11.136 | 0.9970 | 0.0031 | 21 | 9.545 | 8.882 | 0.9974 | 0.0027 |
| 2 | 6.521 | 6.534 | 0.9972 | 0.0028 | 22 | 6.043 | 6.140 | 0.9973 | 0.0027 |
| 3 | 10.190 | 10.210 | 0.9972 | 0.0028 | 23 | 5.724 | 5.712 | 0.9973 | 0.0028 |
| 4 | 6.043 | 6.140 | 0.9973 | 0.0027 | 24 | 11.250 | 10.547 | 0.9971 | 0.0030 |
| 5 | 5.242 | 5.370 | 0.9974 | 0.0026 | 25 | 11.110 | 11.136 | 0.9970 | 0.0031 |
| 6 | 19.020 | 18.995 | 0.0028 | 0.9971 | 26 | 14.360 | 14.334 | 0.0027 | 0.9972 |
| 7 | 14.150 | 14.134 | 0.0028 | 0.9972 | 27 | 19.610 | 19.061 | 0.0028 | 0.9972 |
| 8 | 14.360 | 14.334 | 0.0027 | 0.9972 | 28 | 13.650 | 13.918 | 0.0029 | 0.9971 |
| 9 | 27.420 | 27.373 | 0.0027 | 0.9973 | 29 | 12.430 | 12.293 | 0.0030 | 0.9969 |
| 10 | 15.390 | 15.383 | 0.0027 | 0.9973 | 30 | 19.020 | 18.995 | 0.0028 | 0.9971 |
| 11 | 5.724 | 5.712 | 0.9973 | 0.0028 | 31 | 6.380 | 7.178 | 0.9972 | 0.0028 |
| 12 | 9.766 | 9.791 | 0.9973 | 0.0027 | 32 | 6.521 | 6.534 | 0.9972 | 0.0028 |
| 13 | 5.8700 | 5.747 | 0.9974 | 0.0026 | 33 | 16.000 | 11.239 | 0.9969 | 0.0032 |
| 14 | 5.406 | 5.450 | 0.9973 | 0.0027 | 34 | 7.219 | 9.018 | 0.9971 | 0.0029 |
| 15 | 10.190 | 10.210 | 0.9972 | 0.0028 | 35 | 5.724 | 5.712 | 0.9973 | 0.0028 |
| 16 | 15.390 | 15.383 | 0.0027 | 0.9973 | 36 | 19.020 | 18.995 | 0.0028 | 0.9971 |
| 17 | 19.680 | 19.652 | 0.0027 | 0.9973 | 37 | 13.390 | 13.892 | 0.0030 | 0.9970 |
| 18 | 21.060 | 21.046 | 0.0027 | 0.9973 | 38 | 12.680 | 12.672 | 0.0029 | 0.9971 |
| 19 | 14.150 | 14.134 | 0.0028 | 0.9972 | 39 | 19.610 | 19.061 | 0.0028 | 0.9972 |
| 20 | 12.680 | 12.672 | 0.0029 | 0.9971 | 40 | 15.390 | 15.383 | 0.0027 | 0.9973 |

INFERENCE RULE DETERMINING METHOD AND INFERENCE DEVICE

Matter enclosed in heavy brackets [ ] appears in the original patent but forms no part of this reissue specification; matter printed in italics indicates the additions made by reissue.

This *is a reissue of application Ser. No. 07/904,690, filed Jun. 26, 1992, now U.S. Pat. No. 5,255,344, which* is a continuation of application Ser. No. 07/459,815, filed as PCT/JP89/00504, May 19, 1989, now U.S. Pat No. 5,168,549.

TECHNICAL FIELD

The present invention relates to inference rule determining methods and inference devices in controlling apparatus, in the inference of an expert system, and in pattern recognition based on input data.

BACKGROUND ART

In order to describe a conventional technique, first, the basic fuzzy inference will be outlined by taking as an example fuzzy control used in apparatus control, etc.

In a control system which relates to the evaluation of human beings, the operator can determine a final manipulated control variable using a variable which the operator has determined subjectively and/or sensuously, for example, "large", "middle", "tremendously", or "a little" (which is hereinafter referred to as a fuzzy variable). In this case, the operator determines the manipulated variable from the input variables on the basis of his control experience. An inference device using fuzzy control assigns an input fuzzy number to an IF part of an inference rule in accordance with the inference rule of "IF . . . THEN . . . " type and determines an output fuzzy number of the THEN part from a fitting grade (membership value) indicative of the extent to which the inference rule is satisfied. The actual manipulated variable can be obtained by taking the center of gravity value, etc., of the output fuzzy number.

One of the conventional control methods using fuzzy inference is fuzzy modeling disclosed, for example, in Gean-Taek Kang, Michio Sugano; "fuzzy modeling" SOCIETY OF INSTRUMENT AND CONTROL ENGINEERS PAPERS, Vol. 23, No. 6, pp. 650–652, 1987. In the control rule of the fuzzy modeling, the IF part is constituted by a fuzzy proposition and the THEN part is constituted by a regular linear equation between inputs and outputs. If a timing lag of first order tank model is considered, for example, the control rule among a control error e, its change in error de and a control output (manipulated variable) u is given by If e is Zero and de is Positive Medium
Then u=0.25 e+1.5 de A plurality of such inference rules are prepared, all of which are referred to as control rules Zero, Positive Medium, etc., are each a label or a fuzzy variable (fuzzy number) used to described the rules. FIG. 1 illustrates one example of a fuzzy variable. In FIG. 1, NB denotes Negative Big; NM, a negative Medium; NS, a Negative Small; ZO, a Zero; PS, Positive Small; PM, a Positive Medium; and PB, Positive Big, A function indicative of a fuzzy number F on X is referred to as a membership function $\mu_f(\ )$ and the function value of $x^0$ is referred to as a membership value $\mu_F(X^0)$. The general form of the control rules is given by $$R^5\text{: If } x_1 \text{ is } A_1^s,\ x_2 \text{ is } A_2^s,\ \ldots,\ x_m \text{ is } A_m^s$$

$$\text{Then } y^s = c_0^s + c_1^s x_1 + c_2^s x_2 + \ldots + c_m^s x_m$$

where $R^5$ indicates a $s^{th}$ rule; $x_j$, an input variable; $A_j^s$, a fuzzy variable; $y^s$, an output from the $s^{th}$ rule; and $c^s$, a THEN part parameter. The result of inference for an input $(x_1^0, x_2^0, \ldots x_m^0)$ is given by $$y = \frac{\sum_{s=1}^{n} w^s y^s}{\sum_{s=1}^{n} w^s}$$

where n is the number of rules, and $w^s$ is a fitting grade at which the input $(x_1^0, x_2^0, \ldots, x_m^0)$ is adapted to the IF part of the $S^{th}$ rule $W^s$ is given by $$W^s = \prod_{j=1}^{m} \mu A_j^s(X_j^\theta)$$

where the membership value in the $x^0$ in the fuzzy variable $A_j^s$ is $\mu_{Aj}^s(xj)$. The identification of a fuzzy model includes a two-stage structure, namely, identification of the structure of the IF and THEN parts and identification of the IF and THEN parts. The conventional identifying process includes the steps of (1) changing the fuzzy proposition of the IF part to a proper proposition, (2) changing $W^s$ in a constant manner, (3) searching only the actually required ones of the input variables of the THEN part using a backward elimination method, (4) calculating parameters of the THEN part using the method of least squares, (5) repeating the steps (2)–(4) to determine an optimal parameter, (6) changing the fuzzy proposition of the IF part and (7) returning to the step (2) where an optimum parameter is repeatedly arched under the conditions of a new fuzzy proposition. Namely, this method can be said to be a heuristic method-like identifying algorithm.

A conventional inference device includes a fuzzy inference device, for example, shown in FIG. 2 in which reference numeral 1a denotes a data input unit (including a measured value and a value evaluated by human being); 2a, a display command unit; 3a, a fuzzy inference operation unit; 4a, an inference result output unit; and 5a, a display. The display 2a is composed of a keyboard, and the fuzzy inference operation unit 3a is composed of a digital computer. The input data to the digital input unit 1a is subjected to inference operation at the fuzzy inference operation unit 3a. Thus, the operation unit 3a outputs the result of the inference and simultaneously displays a list of inference rules, a list of fuzzy variables and the states of use of various inference rules on the display 5a. In a conventional inference device such as that shown in FIG. 2, the inference rules of the fuzzy inference rules and the fuzzy variables as input data are fixed as constant values in the fuzzy inference operation unit 3a and have no function of changing the fuzzy variables.

Since an algorithm of determining a membership function is based on heuristic method in the conventional inference rule determining method as well as in the fuzzy modeling, it is complicated and the number of parameters to be determined is very large. Therefore, optimal inference rules cannot be obtained easily at high speed.

Since an influence device such as that shows in FIG. 2 has no function of learning inference rules, the characteristic of the inference variable changes with time, so that it cannot cope with the situation that the inference accuracy would be deteriorated according to the inference rules set initially. Assume, for example, that there is the inference rule "If it is hot, then control diarie a so as to be in level B." Since the obscure concept "hot" varies from person to person as well as season to season, satisfactory control cannot be achieved unless the inference device has a learning function and can change the inference rules adaptively in accordance with situations under which the device is used. Furthermore, there are actually many cases where non-linear inference is required, so that a method of performing linear approximation described with reference to the above conventional example has a limit to improvement in the inference accuracy.

SUMMARY OF THE INVENTION

In order to solve the above problems, it is a first object of the present invention to provide an inference rule determining process for automatically determining a fuzzy number contained in the inference rules described in the form "IF . . . THEN. . ." using a learning function without relying upon experience.

It is a second object of the present invention to provide an inference device which is capable of coping with an inference problem at high speed even if the problem is non-linear, using the non-linearity of a neural network model. In the inference device, a membership value determiner constituting the neural network infers from the input variables a membership value corresponding to the IF part of each inference rule. The individual inference quantity determiner of the inference device infers from the input variables an inference quantity corresponding to the THEN part of the inference rule. The final inference quantity determiner makes a synthetic determination based on the inference quantity and the membership value inferred for each of the rules for the input variables and obtains a final inference quantity. The present invention is the inference device which functions as described above.

BRIEF DESCRIPTION OF THE DRAWINGS

FIG. 10 is a schematic of input/output data used for describing the operation of the FIG. of embodiment 1;

FIG. 11 illustrates the membership value of each learning data in the IF part of the FIG. 9 embodiment;

FIG. 12 illustrates an inference error produced when the number of input variables is reduced;

FIG. 13 illustrates the result of inferring the inference quantity of the FIG. 9 embodiment;

BEST MODE FOR CARRYING OUT THE INVENTION

The features of the inventive method lies in sequentially determining membership functions using a learning function. Various methods of realizing the learning function are conceivable. In a first-embodiment, a learning algorithm of a neural network model is used. Before description of the embodiment, a neural network model and a neural network model learning algorism will be described.

The neural network model is a mathematical network which has gotten a hint from the combination of cranial neural cells. Inference rules can be determined without relying on experience by determining the intensity of connection of units constituting the network using sequential leaning.

Figure 3:
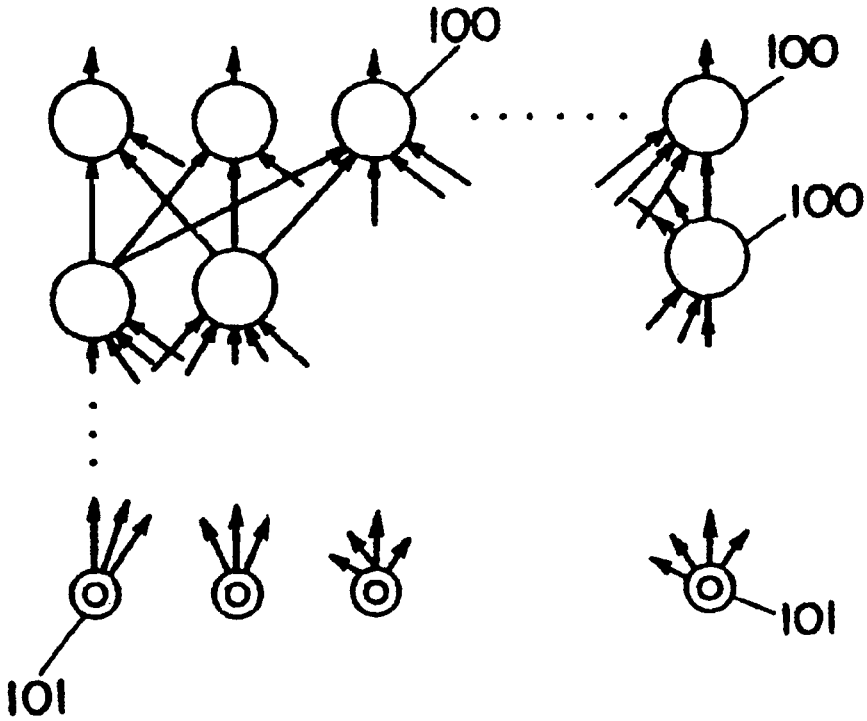
FIGS. 3 and 4 are schematics of neural network models which constitute the membership value determiner and the individual inference quantity determiner.
Figure 4:
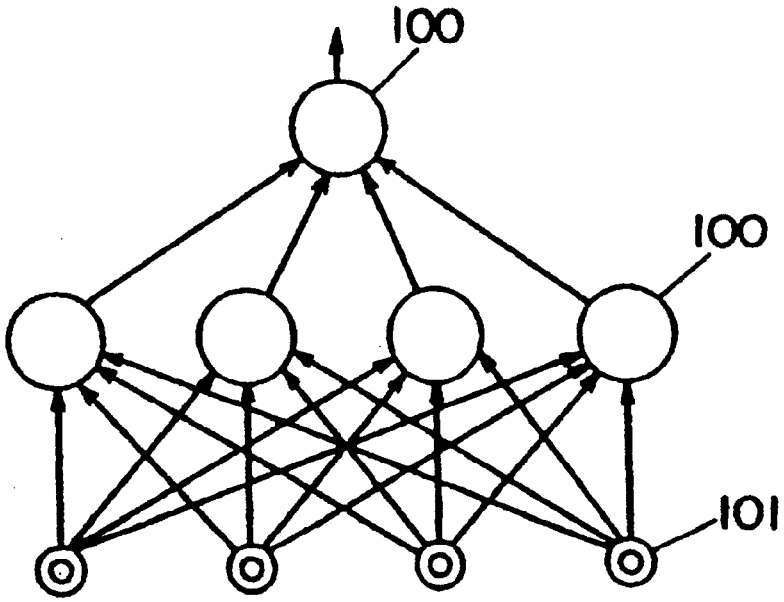
Figure 5:
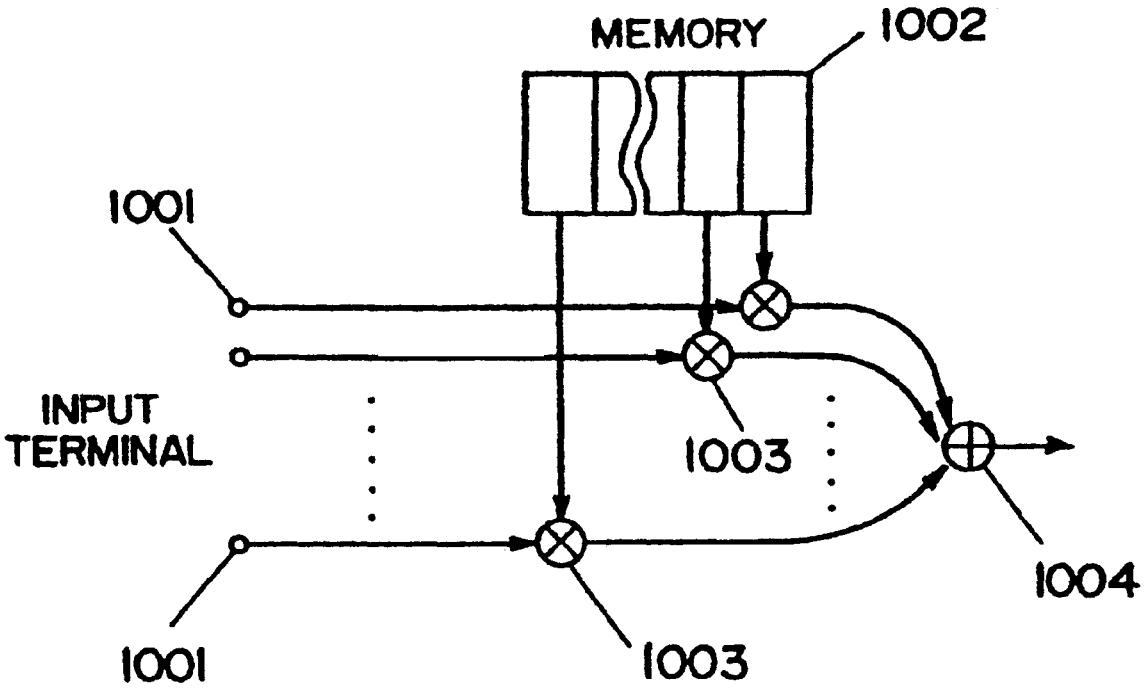
FIG. 5 is a schematic of a linear signal processor.
Figure 6:
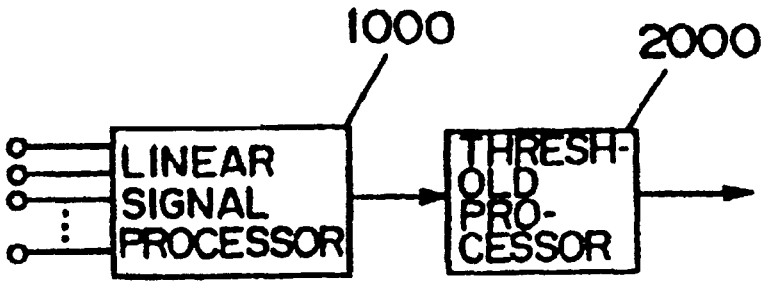
FIG. 6 is a schematic of a non-linear signal processor.
Figure 7:
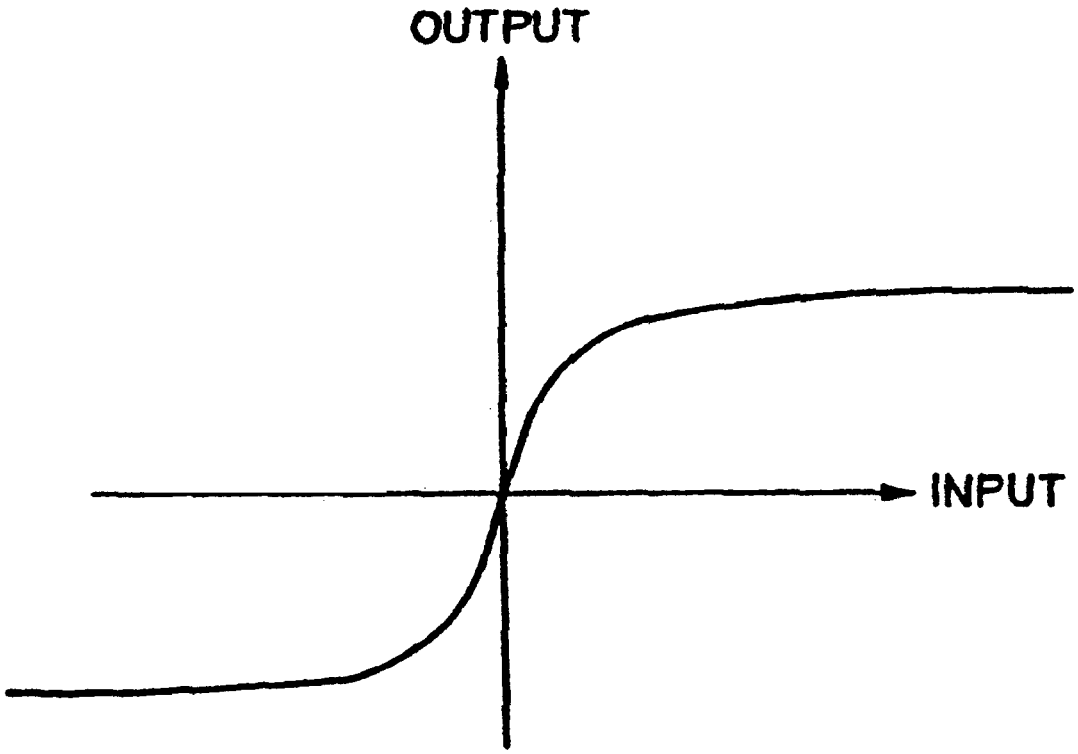
FIG. 7 is an input-output characteristic diagram of a threshold processor.

The network of FIG. 3 is a kind of a neural network model. In FIG. 3, reference numeral 100 denotes a multi-input-single output signal processor; and 101, input terminals of the neural network model. FIG. 4 shows an example of a 3-stage structured neural network model which receives four input variables and output a single output value. There is no interconnection in each stage and a signal is propagated to an upper stage only. FIG. 5 specifically illustrates the structure of a linear signal processor which basically includes a linear computation section of the multi-input-single output signal processors 100 constituting the neural network model. In FIG. 5, reference numeral 1001 denotes each of input terminals of the multi-input-single output signal processor 100; 1002, a memory which stores weighting coefficients given to the corresponding inputs from the input terminals 1001; 1003, multipliers which multiply the inputs from the input terminals 1001 by the corresponding weight coefficients in the memory 1002; and 1004, an adder which adds the respective outputs from the multipliers 1003. Namely, the multi-input-single output signal processor 100 of FIG. 5 calculates $$y=\Sigma cpx_i$$

where $x_i$ is an input value to the corresponding one of the input terminals 1001 and $c_i$ is the corresponding one of the weight coefficients stored in the memory 1002. FIG. 6 specifically illustrates the structure of a non-linear signal processor, which performs a nonlinear operation, of the multi-input-single output signal processors 100 which constitute the neural network model. In FIG. 6, reference numeral 1000 denotes the linear signal processor described with reference to FIG. 5; and 2000, a threshold processor which limits the output from the linear signal processor to a value in a predetermined range. FIG. 7 illustrates the input-output characteristic of the threshold processor 2000. For example, the input/output characteristic of the threshold processor 2000 which limits the output from the linear signal processor 1000 to within the range (0, 1) is represented mathematically by $$OUT=1/(1+\exp(-IN))$$

where IN and OUT are the input and output to and from the threshold processor 2000.

The input/output relationship in the neural network is represented by $$Y=NN(x) \tag{1}$$

In the description of the embodiment, the model size is represented by the k-layer $|\mu_0 \text{ x } \mu_1 \text{x} \ldots \text{x } \mu_k|$ where $\mu_i$ is the number of neuron models of each of the input, middle and output layers. The above refers to a general description of the neural network model.

The learning algorithm of the neural network model will now be described. Various learning, algorithms are proposed, one of which is a backpropagation (D. E. Rumelhart, G. E. Hinton and R. J. Williams, "Learning Representations by Back-Propagating Errors," Nature, Vol. 323, pp. 533–536, Oct. 9, 1986). The mathematical verification and formulation of this algorithm are left to references, but it is basically described as follows. First, a multiplicity of sets of input variables as learning data and percentage values belonging to the respective inference rules inferred by other means are prepared. Input data is input to the neural network model. Initially, an appropriate value, for example a random number value, is input in the memory 1002. The error between the output value from the neural network model and the percentage value belonging to the inference rules is calculated. Since the error is a function of the weight coefficients in the memory 1002, the weight coefficient is corrected in the direction of weight differentiation with respect to the error. Namely, the error is minimized and leaning is performed by correcting the weights sequentially in accordance with the Steepest Decent Method. This is the summary of the learning method using Backpropagation Algorithm.

An inference rule determining process and the inference quantity calculating process according to the present invention will be descried using the neural network model and leaning algorithms.

Step 1

Only input variables having high correlation to an inference value are selected and unnecessary input variables are removed. If the determination is performed, for example, using the neural network model, first, respective input variables $x_j$ where j=1, 2, . . . k are assigned to the neural network model and learning is performed such that an inference value $y_i$ is obtained. Similar learning is performed by decrementing the number of input variables by one. Similarly, the backward elimination method is repeated. The difference between each output of the neural network model which has completed the corresponding learning and the inference value $y_i$ is compared using the error sum of squares as an evaluation index, and only the input variables ($X_j$ where j=1, 2, . . . m, where $m \leqq k$) to the neural network model present when the error is minimized are selected.

Step 2

The input/output data ($x_i$, $y_i$) is divided into $n_t$ data segments for identifying the structure of in inference rule (hereinafter described as TRD) and $n_o$ inference rule evaluation data segments (hereinafter described as CHD) where $n=n_t+N_o$.

Step 3

Each TRD is divided into optimal r sub-segments using regular clustering method. Each set of learning data segments to which the TRD is divided is $R^s$ where s=1, 2, . . . , r, and the learning data on $R^s$ is ($x_i^s$, $Y_i^s$) where i=1, 2, . . . , $(n_t)^s$ where $(n_t)^s$ denotes the number of data of the TRD in each $R^S$. The r-division of an m-dimensional space means that the number of inference rules is r.

Step 4

The IF part structure is identified. $X_i$ is an input value to the input layer of the neural network model and the output value from the output layer is given by $$W_i^s = \begin{cases} 1 : X_i \in R^s \\ 0 : X_i \ R^s \end{cases}$$

where i = 1, . . . , $n_t$ and s = 1, . . . , r

A neural network model is learned such that the grade $w_i^s$ of each learning data ($x_i$) belonging to each $R^s$ is inferred. The output value from the neural network model after learning is the membership value of the IF part. Namely, the membership function is given by $$\mu_A{}^s(x_i)=w_i^s$$

where i=1, 2, . . . , n

Step 5

The structure of the THEN part is identified. The THEN part structure model of each inference rule is A represented by the input-output relation (1) of the neural network model and the input values $x_i^s$, . . . , $x_{im}{}^s$ where i=1, 2, . . . , $(n_i^s)$ and the output value $y_i^s$ are allocated. A neural network model which infers the inference quantity by learning is identified. Substituting the CHD input values $x_{il}^s$, . . . , $x_{im}{}^s$ where i=1, 2, . . . , $n_c$ into the resulting neural network model and the error sum of squares $O^s$ is calculated by $$\theta_m^s = \sum_{i=1}^{nc} (y_i^s - y_i^s \times \mu A^s(x_i)$$

There is another idea to calculate $\theta_m{}^s$ with the weight; this is $$\sum_{i=l}^{nc} \mu A^s(x_i)(y_i^s - y_i^s \times \mu A^s(x_i))^2.$$

Step 6

Only the input variables contributing to the inference quantity inferring equation of the THEN part of each inference rule are selected using variable reducing method. Only any one of m input variables is removed and a neural network model is then identified for each THEN part using the TRD similarly to step 5. The inferred error sum of squares $\theta_{m-1}{}^{sp}$ of the inference quantity obtained when the CHD is used is calculated as follows:

$$\theta_{m-1}^{sp} = \sum_{i=1}^{nc} (y_i^s - y_i^s \times \mu A^s(x_i))^2$$

where p = 1, 2, . . . , m

From the above expression, it will be seen to what extent the removed input variable is important to determine the THEN part. If $$\theta_m{}^s > \theta_{m-1}{}^{sp},$$

the input variable $x^p$ is discarded because it is considered to be not important.

Step 7

An operation similar to step 5 is performed by using the m remaining input variables. Subsequently, steps 5 and 6 are repeated and the calculation is stopped when no equation (2) holds for all the input variables. The optimal neural network model is the one where $O^s$ minimum.

The steps 1–7 determine the IF and THEN parts for each inference rule and the identification of the structure of the fuzzy inference rule ends.

Step 8

The quantity of inference $y_i$ is obtained by $$y_i = \frac{\sum_{s=1}^{F} w_i^s \tilde{y}_i^s}{\sum_{s=1}^{F} w_i^s} \quad (3)$$

where $i = 1, 2, \ldots, n_0$ where $\tilde{y}^s$ shows a presumed value obtained by substituting CHD into the optimal neural network model obtained at step 7.

If the neural network model includes a collection of non-linear characteristics of FIG. 7, the inference of a non-linear object is automatically possible by this learning process, of course.

Thus, if the inference rule is determined by the inventive process, the inference rules are obtained easily and accurately without using the heuristic method since the inference rules are determined sequentially using the leaning function even if the object to be inferred is in a non-linear relationship or in an obscure input/output relationship.

The inventive process described above will now be described using specific experimental values. In the particular experiment, the inference rule and the quantity of inference were determined using simple numeral examples shown in Tadashi Kondo, Revised GMDH Algorithm Estimating Degree of the Complete Polynomial, SOCIETY OF INSTRUMENT AND CONTROL ENGINEERS PAPERS, Vol. 22, No. 9, pp. 928–934, 1986. The process for determining the inference rule will be described below.

Steps 1, 2

FIG. 10 shows input/output data where data numbers 1–20 denote data for determining the structure of an inference rule (TRD) used in learning and data numbers 21–40 denote evaluation data (CHD). Therefore, $n_t=n_c=20$ and m=2. Input variables were selected by learning 15,000 times in a three-layered (3×3×3×1) neural network model. The results are shown in Table 1.

TABLE 1

| | ERROR SUM OF SQUARES |
|---|---|
| when all variables were used | 0.0007 |
| when $x^1$ was removed | 0.3936 |
| when $x^2$ was removed | 0.1482 |
| when $x^3$ was removed | 0.0872 |
| when $x^4$ was removed | 0.0019 |

The error sum of squares is not so much influenced even if the input variable $x^4$ is added or otherwise removed. Therefore, it is determined that it does not virtually influence the determination of the membership function and thus is not used in the subsequent experiments.

Step 3

The TRD is divided using the regular clustering method. As the result of the clustering, each learning data is dividable into two segments as shown in Table 2.

TABLE 2

| INFERENCE RULES | LEARNING DATA NUMBERS |
|---|---|
| $R^1$ | 1, 2, 3, 4, 5, 11, 12, 13, 14, 15 |
| $R^2$ | 6, 7, 8, 9, 10, 16, 17, 18, 19, 20 |

Step 4

In order to infer with the value of $W^s \epsilon [0,1]$ a proportion $W_i^s=\{0, 1\}$ belonging to leaning data $(x_i, y_i)$ where i=1, 2, . . . , 20, the three-layered [3×3×3×2] neural network model was learned 5,000 times to obtain the fuzzy number $A^s$ of the IF part. FIG. 11 illustrates the fuzzy number $A^1$ of the IF part for the inference rule $R^1$ at this time. The input data in Table 2 where $\mu_R'(x_i, y_i)=W_i^1>0$ was used as the learning data.

Similarly, the fuzzy number of the IF part for $R^2$ was calculated.

Step 5

An inference quantity presuming equation of the THEN part in each inference rule was calculated. The three-layered [3×8×8×1] neural network model was learned 20,000 times and $\theta_4$ was obtained as shown in Table 3.

TABLE 3

| | |
|---|---|
| REFERENCE RULE 1: $O_4$ | 27.86 |
| REFERENCE RULE 2: $O_4$ | 1.93 |

Steps 6, 7

$\theta^s$ is calculated where any one input variable is removed from the structure model of the THEN part of the influence rule $R^s$. A three-layered [2×8×8×1] neural network model was learned 10,000–20,000 times. As a result the error sums of squares of FIG. 12 were obtained for the inference rules $R^1$ and $R^2$, respectively. The comparison between steps 5 and 6 for each inference rule shows that $$\text{all } \theta_3^1 > \theta_4^2 (= 27.8)$$

$$\theta_3^2 < \theta_4^2 (= 1.93) \text{ where } x_1 \text{ is removed.}$$

Therefore, the neural network model at step 5 is used as the THEN part model for inference rule 1. For inference rule 2, calculation is further continued and is ended at the repetitive calculations at the second stage. (The neural network model with $(x_2, x_3)$ inputs is used as the THEN part. The resulting fuzzy model is given by $$R^1\text{: IF } x = (x_1, x_2, x_3) \text{ is } A^1$$

$$\text{THEN } y^1 = NN_1(x_1, x_2, x_3)$$

$$R^2\text{: IF } x = (x_1, x_2, x_3) \text{ is } A^2$$

$$\text{THEN } y^2 = NN_2(x_2, x_3)$$

FIG. 13 illustrates the results of the calculation of $y^O$ in equation (3) using an inference device which executed the rules thus obtained.

While in the particular embodiment the weighted center of gravity defined by equation (3) was employed as the quantity of inference obtained as the results of the fuzzy inference, a process for calculating the central value or maximum value may be used instead. While in the particular embodiment the algebraic product was used in the calculation equation of $w^s$, a fuzzy logical operation such as a miniature calculation may be used instead of the algebraic production.

In the steps of the process for determining the inference rule, the step of determining a non-linear membership function automatically will now be described in more detail.

Figures 8A, 8B, 8C:
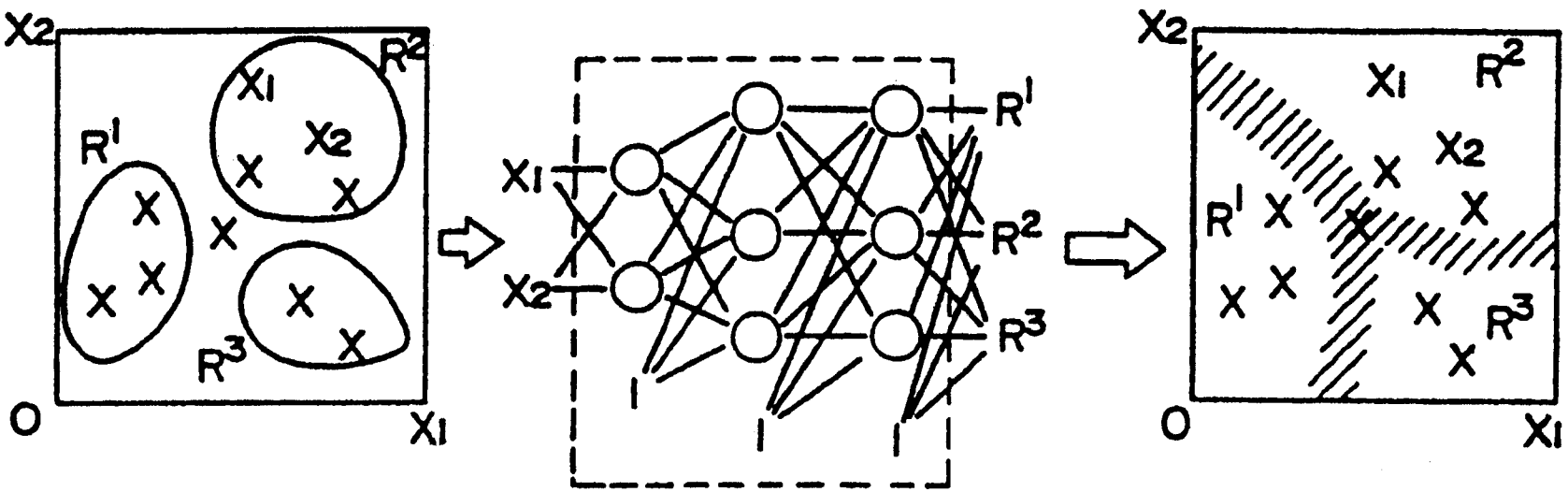
FIG. 8 illustrates a process for automatically determining a membership function using a neural network model.

It is natural that the same reference rule will be applied to similar input data. At step 3, learning data is clustered (FIG. 8(a)). These classes correspond to inference rules in one-to-one relationship. The inference rule is, for example, "IF $x_1$ is small and $x_2$ is large, THEN . . .". Three such inference rules $R_1$–$R_3$ are shown in FIG. 8(a). One hundred percent of each of the inference rules is obeyed at typical points (a set of input data) in these classes, but the data arc more influenced by a plurality of such inference rules nearer the boundary. A function indicative of this percentage is the membership function, the form of which is as shown in FIG. 8(c), for example, which is a view of the membership function as viewed from above and the hatched portion is an area where the membership functions intersect.

A step 3, 4 is for preparing such membership functions. A neural network model of FIG. 8(b) is prepared, variable values (x1 and x2 in FIG. 8(b) of the IF part are allocated to the input while 1 is allocated to a rule number to which the input value belongs and 0 is allocated to rule numbers other than the former rule number in the output. Learning is then performed. One of the important features of the neural network model is that a similar input corresponds to a similar output. While in learning the points x of FIG. 8(a) alone are used, the same output is obtained at points near the points x, namely, the output shows that the same inference rule is obeyed. The neural network model which has finished learning outputs optimal balance percentages belonging to the respective inference rules when it receives data in the vicinity of the boundaries of the respective inference rules. These are the membership values. In other words, the neural network model includes all the membership functions of the respective inference rules.

While in the particular embodiment of the inventive process the membership functions of fuzzy inference rules are determined using the learning algorithm of the neural network, other learning algorithms may be used, of course. As will be easily imagined from the fact that the Back-Propagation algorithm described in the algorithms of the neural network is based on the classic steepest descent method, many learning algorithms will be easily conceived which are used in the field of non-linear minimization problems such as Neuton's method and conjugate gradient method. It is commonsense that in the field of pattern recognition a learning method is used in which a standard pattern which is used for recognition is caused to sequentially approach the input pattern. Such sequential learning process may be used.

While in the step 5 of the embodiment the THEN part has been illustrated as being constructed by a neural network, it may be expressed using another process. For example, if fuzzy modeling such as that described in a conventional method is used, the THEN part will differ from that of the first embodiment in terms of non-linear expression. However, the essence of the present invention will not be impaired which automatically determines the fuzzy number of an inference rule sequentially using the learning function if a learning function such as a neural network model is incorporated in the IF part.

In the particular embodiment of the present invention, the expression "automatic formation of a membership function of a fuzzy inference rule" is used. This special case corresponds to a production rule used in a classic expert system. In such a case, the expression "automatic formation of the reliability of a inference rule" would be more intelligible. However, this is only a special case of the embodiment of the present invention.

Figure 1:
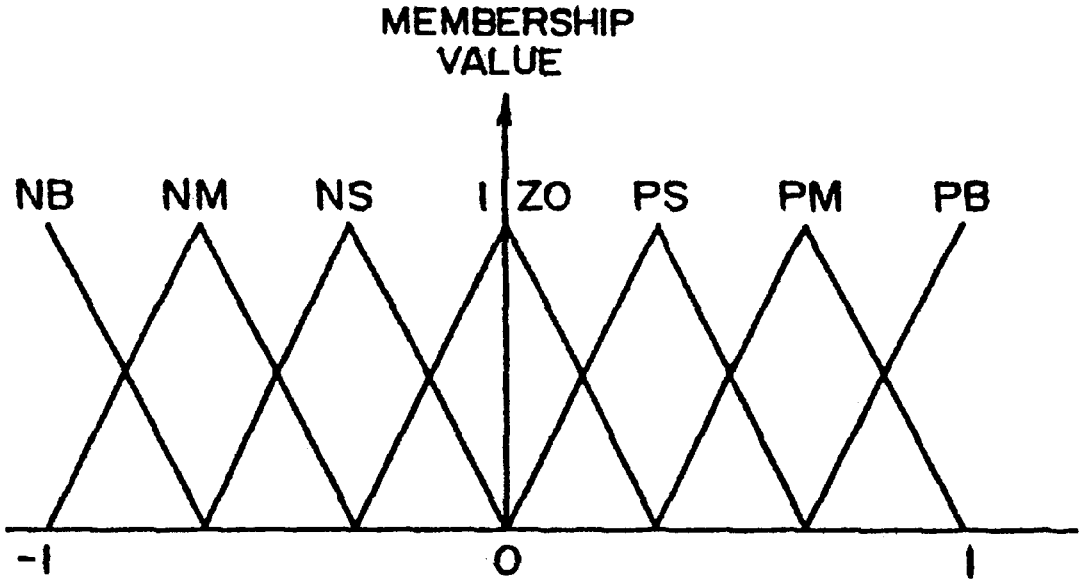
FIG. 1 illustrates fuzzy variables.
Figure 2:
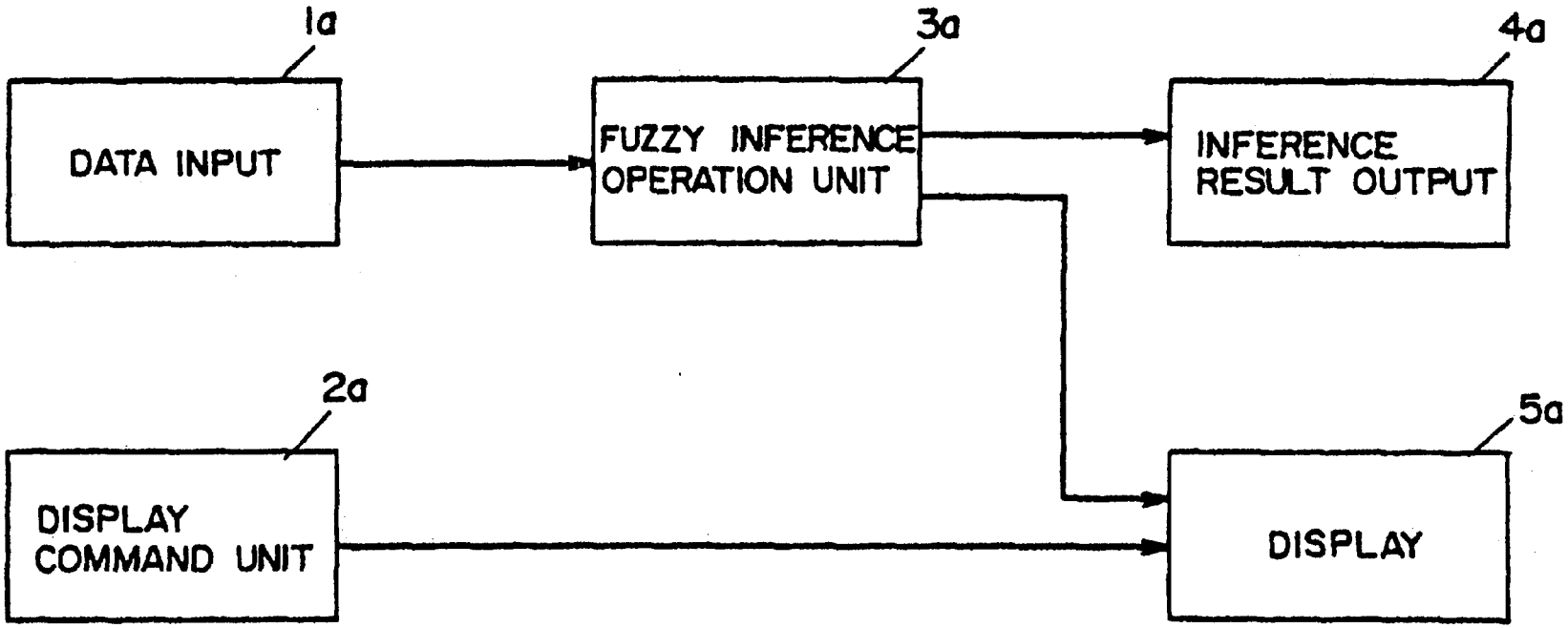
FIG. 2 is a schematic of a conventional inference device.
Figure 9:
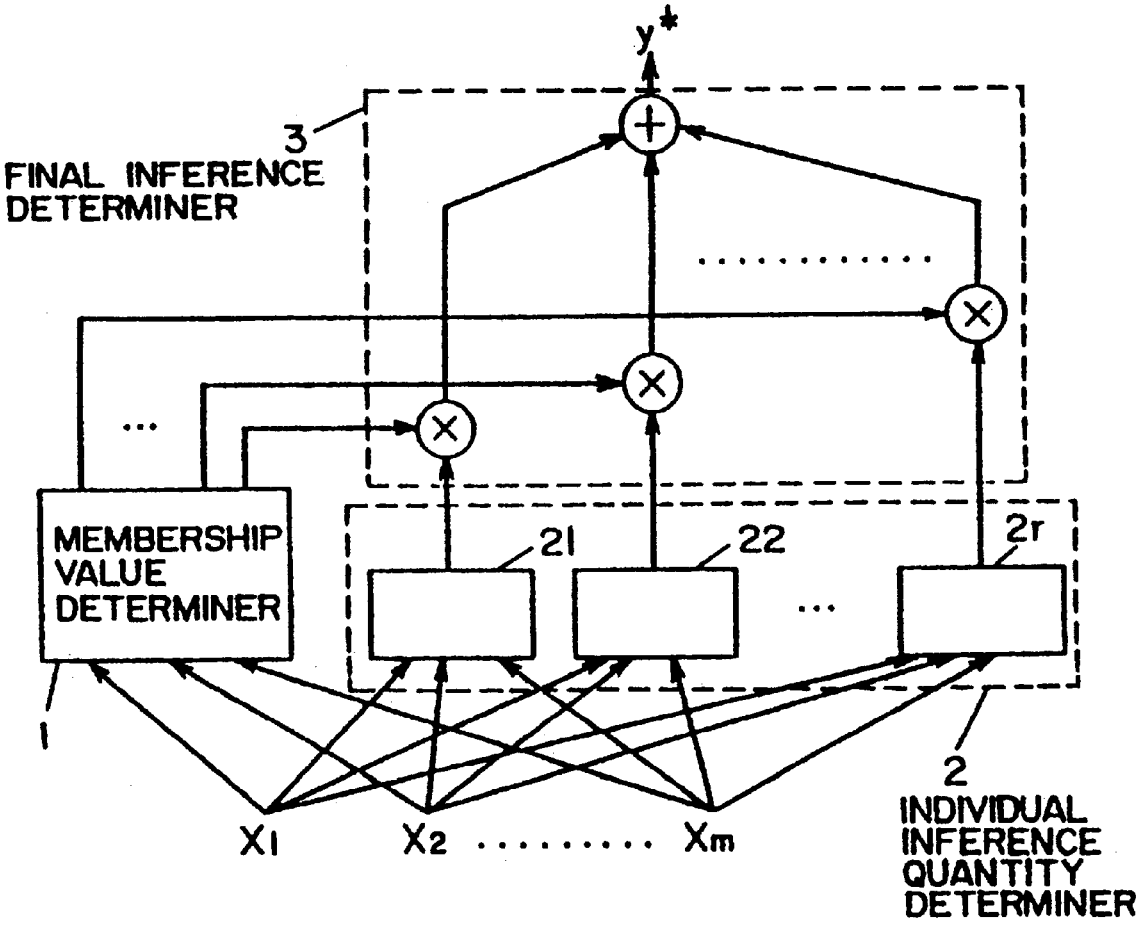
FIG. 9 is a schematic of an inference device of one embodiment in the present invention.

A second embodiment of the invention which performs inference on the basis of the inference rule obtained by the inventive method will now be described. FIG. 9 is a schematic of the first embodiment of the inference device according to the present invention. In FIG. 1, reference numeral 1 denotes a membership value determiner which calculates the membership value of the IF part of each inference rule; 2, an individual inference quantity determiner which infers a quantity of inference to be calculated at the THEN part of each inference rule; and 3, a final inference quantity determiner which determines the final quantity of inference from the outputs of the individual inference quantity determiner 2 and the membership value determiner 1. Reference numerals 21–2r denote the internal structure of the individual inference quantity determiner 21 which determines an inference quantity in accordance with the respective inference rules 1-r. The determiners 1 and 21–2r each have a multi-stage network structure such as shown in FIG. 3.

If input values $x_1$–$x_m$ are input to the inference device of the present invention, the membership value determiner 1 outputs the respective percentages in which the corresponding input values satisfy the respective inference rules. The determiner 1 has beforehand finished its learning in accordance with the steps described in the inference rule determining process of the present invention. The individual inference quantity determiner 21 outputs in inference quantity when those input values obey the inference rule 1. Similarly, the individual inference quantity determiners 21–2r output inference quantities when they obey inference rules 2-r. The final inference quantity determiner 3 outputs a final inference result from the outputs of the determiners 1 and 2. The process for the determination uses the equation (3), for example.

As will be clear from FIGS. 6 and 7, the input/output relationship of the multi-input-single output signal processor 100 which constitutes the neural network model is non-linear. Therefore, the neural network model itself can perform nonlinear inference. Thus, the inference device according to the present invention realizes a high inference accuracy which cannot be achieved by linear approximation.

Figure 14:
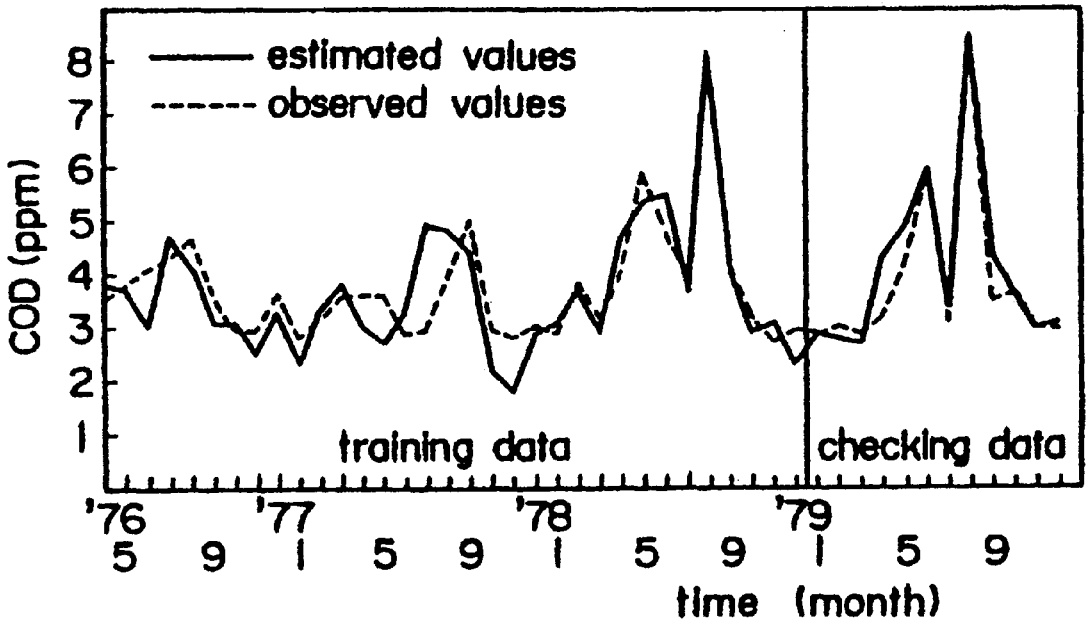
FIG. 14 illustrates the result of the inference according to the present invention applied to the problem of inferring the COD density in Osaka Bay.

High inference accuracy of the present invention will be illustrated using a specific application. The application refers to the inference of the COD (Chemical Oxygen Demand) density from five parameters measured in Osaka Bay from April, 1976-March, 1979. The five measured parameters are (1) water temperature (°C.), (2) transparency (m), (3) DO density (ppm), (4) salt density (%), and (5) filtered COD density (ppm). In this data, 32 sets of data obtained from Apr., 1976 to Dec., 1978 were used for learning and the remaining 12 sets of data were used for evaluation after the leaning process. FIG. 14 illustrates the result (solid line) estimated by the present invention and the actual observed values of COD density (broken lines). It will be understood that the presumed result is a very good one.

As described above, the first embodiment of the inventive inference device includes a membership value determiner constituted by a plurality of multi-input-single output signal processors connected in at least a network such that it has a learning function and is cable of determining a quantity of inference corresponding to the input variables in a non-linear relationship.

A second embodiment of the inventive inference device is capable of performing approximate inference by storing in memory the beforehand obtained input/output relationship of a predetermined neural network model, and referring to the memory instead of execution of neural network model directly each time this execution is required. While in the first embodiment the membership value and individual inference quantity determiners are described as having a neural network model structure, an input-output correspondence table may be prepared beforehand from a neural network model determined by a learning algorithm if the input variables are obvious beforehand and/or if close approximation is permissible. Although the inventive method cannot be incorporated so as to have a learning function in the second embodiment which functions as a substitution for the membership value determiner or the individual inference quantity determiner by referring to the correspondence table during execution of the inference rule, an inexpensive small-sized inference device is realized because no circuit structure such as that shown in FIG. 5 is needed. The inference corresponding to non-linearity can be performed as in the first embodiment of the inference device of the present invention.

As described above, according to the second embodiment, at least one of the membership value determiner and the individual inference quantity determiner is composed of the memory which beforehand stores the input/output characteristic of the inference unit constituted by a plurality of multi-input-single output processors connected to at least the network, and the memory referring unit. Thus, the inference device has a simple circuit structure for determining an inference quantity corresponding to input variables in a non-linear manner.

INDUSTRIAL APPLICABILITY

As described above, according to the present invention, an inference rule is prepared which has a learning function, forms an inference rule automatically and performs the best inference. According to the inventive inference device, inference is performed with high accuracy even if an object to be inferred is non-linear, so that the device is valuable from a practical standpoint.

We claim:

1. A method of determining fuzzy inference rules for an adjusting device to adjust output characteristics of a membership value determiner in an inference device to be used in an outer system, said inference device comprising a system variable input device for receiving input signals from said outer system and for generating an input vector from said input signals to the inference device;

the membership value determiner for generating a membership value indicative of the degree of attribution of the input vector to an IF part of a fuzzy inference rule of an IF-THEN type, the input vector being received from the system variable input device;

an individual inference quantity determiner for generating a first inference quantity of the input vector corresponding to the THEN part of a fuzzy inference rule, the input vector being received from the system variable input device;

a final inference quantity determiner for determining a final inference quantity by processing values attained from the inference quantities generated by the individual inference quantity determiner and the corresponding membership values; and an adjusting device, receiving said input vector and said observed output from said system variable input device and said final inference quantity, for adjusting output characteristics of the membership value determiner, wherein said membership value determiner includes a signal processing network having input terminals receiving input vectors from the system variable input device, output terminals and an artificial neural network structure including a plurality of multiple input-single output signal processors each receiving plural respective outputs from one or more others of said signal processors and providing one output to one or more others of said signal processors;

each of the multiple input-single output signal processors having an artificial neural network structure comprising a signal processor which includes a memory for storing a plurality of weighting coefficients to define membership values;

a plurality of multipliers for weighting the input vector from the system variable input device with the weighting coefficients read from the memory;

at least one adder for generating output data by adding plural weighted input vectors from said multipliers; and a threshold processor for generating an output as a membership value by clipping the output data from said adders within a predetermined range;

the method comprising the steps of:

(a) receiving and clustering the input vectors from the system variable input device and providing class numbers based on degree of similarity of the input vector, said class numbers corresponding to the output terminals of the membership value determiner respectively;

(b) calculating an ideal output vector on the assumption that the ideal output vector is output from only the corresponding output terminals of the signal processing network corresponding to the class numbers provided as the result of clustering;

(c) obtaining a difference between the ideal output vector and said first inference quantity from the signal processing network when said network receives the input vector from the system variable input device;

(d) altering the weighting coefficients stored in the memory in order to decrease the obtained difference;

(e) reiterating the above steps until the difference becomes less than a predetermined value so that a proper output characteristic is obtained for the signal processing network; and (f) fixing the output characteristic of the membership value determiner based on the output characteristics of the signal processing network after the reiterating step (e) is performed.

*2. A method of determining inference rules in accordance with a fuzzy inference rule which has an IF part and a THEN part, the method comprising:*

*(a) providing a signal processor configured to act as an artificial neural network;*

*(b) training the signal processor in at least the IF part of the fuzzy inference rule so that an output of the fuzzy inference rule as provided by the signal processor approaches an optimum output to derive a membership function defining at least an input fuzzy variable of the IF part; and*

(c) *determining the inference rule in accordance with the membership function.*

*3. A method as in claim 2, wherein step (b) comprises:*

(i) *inputting input data into the signal processor;*

(ii) *inputting into the signal processor as supervised data a membership value with which the fuzzy inference rule fuzzy-divides an input space which comprises the input data; and*

(iii) *training the signal processor in an input-output relation between the input data and the supervised data to derive the membership function defining the input fuzzy variable of the IF part.*

*4. A method as in claim 2, wherein step (b) comprises adjusting a parameter which defines a shape of the membership function to derive the membership function.*

*5. A method of determining inference rules in accordance with a fuzzy inference rule which has an IF part and a THEN part, the method comprising:*

(a) *providing a signal processor configured to act as an artificial neural network:*

(b) *training the signal processor in at least the THEN part of the fuzzy inference rule so that an output of the fuzzy inference rule as provided by the signal processor approaches an optimum output to derive a membership function defining at least an output of the THEN part; and*

(c) *determining the inference rule in accordance with the membership function.*

*6. A method of determining inference rules in accordance with a fuzzy inference rule which has an IF part and a THEN part, the method comprising:*

(a) *providing at least one signal processor configured to act as an artificial neural network;*

(b) *training the at least one signal processor in the IF part and the THEN part of the fuzzy inference rule so that an output of the fuzzy inference rule as provided by the at least one signal processor approaches an optimum output to derive a first membership function defining an input fuzzy variable of the IF part and a second membership function defining an output of the THEN part; and*

(c) *determining the inference rule in accordance with the first membership function and the second membership function.*

*7. A method as in claim 6, wherein step (b) comprises:*

(i) *inputting input data into the signal processor;*

(ii) *inputting into the signal processor as supervised data a membership value with which the fuzzy inference rule fuzzy-divides an input space which comprises the input data; and*

(iii) *training the signal processor in an input-output relation between the input data and the supervised data to derive the membership function defining the input fuzzy variable of the IF part.*

*8. A method as in claim 6, wherein step (b) comprises adjusting a parameter which defines a shape of the first membership function to derive the first membership function.*

*9. An inference device comprising:*

*a membership value determiner for determining membership function values corresponding to IF parts of fuzzy inference rules from input values;*

*an individual inference quantity determiner for determining a control operation quantity corresponding to an output of a THEN part of said fuzzy inference rule; and*

*a final inference quantity determiner for determining a final control inference quantity in accordance with an output of said membership value determiner and an output of said individual inference quantity determiner;*

*said membership value determiner comprising a signal processing network including at least a plurality of multi-input/single-output signal processors connected in network with one another.*

*10. An inference device according to claim 9 in which said membership value determiner further comprises a memory for storing a pre-calculated relation between an input and an output of the signal processing network.*

*11. An inference device comprising:*

*a membership value determiner for determining membership function values corresponding to IF parts of fuzzy inference rules from input values;*

*an individual inference quantity determiner for determining a control operation quantity corresponding to an output of a THEN part of said fuzzy inference rule; and*

*a final inference quantity determiner for determining a final control inference quantity in accordance with an output of said membership value determiner and an output of said individual inference quantity determiner;*

*said individual inference quantity determiner comprising a signal processing network including at least a plurality of multi-input/single-output signal processors connected in network with one another.*

*12. An inference device according to claim 11 in which said individual inference quantity determiner further comprises a memory for storing a pre-calculated relation between an input and an output of the signal processing network.*

*13. An inference device comprising:*

*a membership value determiner for determining membership function values corresponding to IF parts of fuzzy inference rules from input values;*

*an individual inference quantity determiner for determining a control operation quantity corresponding to an output of a THEN part of said fuzzy inference rule; and*

*a final inference quantity determiner for determining a final control inference quantity in accordance with an output of said membership value determiner and an output of said individual inference quantity determiner;*

*each of said membership value determiner and said individual inference quantity determiner respectively comprising a signal processing network including at least a plurality of multi-input/single-output signal processors connected in network with one another.*

*14. An inference device according to claim 13 in which at least one of said membership value determiner and said individual inference quantity determiner further comprises a memory for storing a pre-calculated relation between an input and an output of the signal processing network of said at least one of said membership value determiner and said individual inference quantity determiner.*

* * * * *